(12) United States Patent
Zhang et al.

(10) Patent No.: US 10,955,572 B2
(45) Date of Patent: Mar. 23, 2021

(54) DATA PROCESSING METHOD AND DEVICE

(71) Applicants: Tsinghua University, Beijing (CN); Nuctech Company Limited, Beijing (CN)

(72) Inventors: Li Zhang, Beijing (CN); Zhiqiang Chen, Beijing (CN); Sen Wang, Beijing (CN); Xiaofei Xu, Beijing (CN); Yuanjing Li, Beijing (CN); Xin Jin, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 216 days.

(21) Appl. No.: 16/137,547

(22) Filed: Sep. 21, 2018

(65) Prior Publication Data

US 2019/0025447 A1   Jan. 24, 2019

Related U.S. Application Data

(63) Continuation of application No. PCT/CN2017/073206, filed on Feb. 10, 2017.

(51) Int. Cl.
*G01T 7/00* (2006.01)
*G01T 1/16* (2006.01)
*G01T 1/36* (2006.01)

(52) U.S. Cl.
CPC .............. *G01T 7/005* (2013.01); *G01T 1/16* (2013.01); *G01T 1/36* (2013.01)

(58) Field of Classification Search
CPC .............. G01T 7/005; G01T 1/16; G01T 1/36
See application file for complete search history.

(56) References Cited

U.S. PATENT DOCUMENTS 6,791,090 B2   9/2004   Lin et al.
7,820,973 B2   10/2010  Ruan et al.
(Continued)

FOREIGN PATENT DOCUMENTS

CN   101210971 A   7/2008
CN   102279408 A   12/2011
(Continued)

OTHER PUBLICATIONS

"Australian Application Serial No. 2017306969, Examination Report dated Aug. 26, 2019", 7 pgs.
(Continued)

*Primary Examiner* — Raymond L Nimox
(74) *Attorney, Agent, or Firm* — Schwegman Lundberg & Woessner, P.A.

(57) ABSTRACT

The present disclosure relates to a data processing method and device. The data processing method comprises steps of: performing detector response calibration based on a detector response obtained by an incidence of rays with known energy into a detector to obtain a detector response model; obtaining a photon counting model of the detector between incident energy spectrum data of the detector and detected energy spectrum data of the detector based on the detector response model; and performing a deconvolution operation on counts of photons in respective energy regions in the detected energy spectrum data of the detector based on the photon counting model of the detector, to obtain real counts of photons in respective energy regions in the incident energy spectrum data of the detector.

9 Claims, 9 Drawing Sheets

(56) References Cited

U.S. PATENT DOCUMENTS

| | | | |
|---|---|---|---|
| 2014/0003580 A1 | 1/2014 | Berruyer | |
| 2014/0233694 A1* | 8/2014 | Wang | A61B 6/582 378/5 |
| 2015/0238161 A1 | 8/2015 | Petschke et al. | |
| 2015/0323687 A1 | 11/2015 | Simpson et al. | |
| 2016/0095561 A1* | 4/2016 | Tamura | A61B 6/032 378/62 |
| 2016/0128650 A1 | 5/2016 | Wang et al. | |
| 2016/0135774 A1 | 5/2016 | Ono et al. | |
| 2016/0195623 A1* | 7/2016 | Wang | G01T 1/171 250/370.09 |
| 2016/0287205 A1* | 10/2016 | Zou | A61B 6/4241 |
| 2017/0273640 A1* | 9/2017 | Danielsson | A61B 6/03 |

FOREIGN PATENT DOCUMENTS

| | | |
|---|---|---|
| CN | 103163548 A | 6/2013 |
| CN | 103853929 A | 6/2014 |
| CN | 104898159 A | 9/2015 |
| CN | 105759304 A | 7/2016 |
| EP | 2871478 A1 | 5/2015 |
| WO | WO-2014/001984 A1 | 1/2014 |
| WO | WO-2015/063463 A1 | 5/2015 |

OTHER PUBLICATIONS

"Chinese Application Serial No. 201610630202.3, Second Office Action and Search Report dated Jul. 26, 2019", (w/ English Translation), 16 pgs.

Chinese Society of Biomedical Engineering, Abstract, Proceedings of the 6th Congress and Academic Meeting of the Chinese Society of Biomedical Engineering, (Apr. 2004), 145-146.

Shual, Ping, et al., "The Principle and Method of X-ray Pulsar Navigation System", China Astronautics Publishing House, (Jul. 2009), 425-426.

"Australian Application Serial No. 2017306969, Examination Report No. 4 dated Nov. 12, 2019", 6 pgs.

"Australian Application Serial No. 2017306969, Examination Report No. 1 dated Apr. 18, 2019", 4 pgs.

"Australian Application Serial No. 2017306969, Examination Report No. 2 dated Jul. 3, 2019", 3 pgs.

"Australian Application Serial No. 2017306969, Response filed Jun. 6, 2019 to Examination Report No. 1 dated Apr. 18, 2019", 33 pgs.

"Australian Application Serial No. 2017306969, Response filed Jul. 4, 2019 to Examination Report No. 2 dated Jul. 3, 2019", 8 pgs.

"Australian Application Serial No. 2017306969, Response filed Oct. 16, 2019 to Examination Report No. 3 dated Aug. 26, 2019", 12 pgs.

"International Application Serial No. PCT/CN2017/073206, International Preliminary Report on Patentability dated Feb. 14, 2019", (w/ English Translation), 10 pgs.

"International Application Serial No. PCT/CN2017/073206, International Search Report dated May 4, 2017", (w/ English Translation), 6 pgs.

"International Application Serial No. PCT/CN2017/073206, Written Opinion dated May 4, 2017", (w/ English Translation), 7 pgs.

Michel, Thilo, et al., "Reconstruction of x-ray spectra with the energy sensitive photon counting detector Medipix 2", *Nuclear Instruments and Methods in Physics Research A 598*, (2009), 510-514.

Sievers, P., et al., "Bayesian deconvolution as a method for the spectroscopy of x-rays with highly pixelated photon counting detectors", *Journal of Instrumentation*, 7 P03003, (2012), 20 pgs.

"Chinese Application Serial No. 2016106302023, Third Office Action dated May 8, 2020", (w/ English Translation), 14 pgs.

"Australian Application Serial No. 2017306969, Examination Report No. 6 dated Apr. 15, 2020", 7 pgs.

"European Application Serial No. 17836147.3, Response filed Jun. 15, 2020 to Office Action dated Apr. 16, 2020", 47 pgs.

Dong, Bao-Yu, "Image Reconstruction Using EM Method in X-Ray CT", Proceedings of the 2007 International Conference on Wavelet Analysis and Pattern Recognition, Beijing, China, Nov. 2-4, 2007, (2007), 130-134.

Sidky, Emil Y., et al., "A robust method of x-ray source spectrum estimation from transmission measurements: Demonstrated on computer simulated, scatter-free transmission data", Journal of Applied Physics 97, 124701, (2005), 11 pgs.

"Australian Application Serial No. 2017306969, Examination Report No. 5 dated Feb. 15, 2020", 6 pgs.

"European Application Serial No. 17836147.3, Extended European Search Report dated Mar. 27, 2020", 7 pgs.

Diehl, R., et al., "Response Determination of Comptel From Calibration Measurements, Models and Simulations", In: *Data Analysis in Astronomy IV*, Edited by V. Di Giesu, et al., Plenum Press, New York, (1992), 201-216.

Touch, Mengheng, et al., "A neural network-based method for spectral distortion correction in photon counting x-ray CT", *Phys. Med. Biol. 61*, (2016), 6132-6153.

"Chinese Application Serial No. 2016106302023, First Office Action and Search Report dated Jan. 2, 2019", (w/ Concise Statement of Relevance), 12 pgs.

Ding, Huanjun, et al., "Characterization of energy response for photon-counting detectors using x-ray fluorescence", Med. Phys., 41(12), (Dec. 2014), 121902-1-121902-11.

Liao, Yu-Ting, et al., "X-ray computed tomography Monte Carlo simulation based on photon counting device", Chinese Journal of Medical Physics, 33(2), (Feb. 2016), 122-127.

\* cited by examiner

DATA PROCESSING METHOD AND DEVICE

CROSS REFERENCE

The present disclosure is a continuation of U.S. National Phase of International Application No. PCT/CN2017/073206, filed on Feb. 10, 2017 and published in Chinese, which claims the benefits of and priority to Chinese Patent Application No. 201610630202.3, entitled "Data processing method and device", filed Aug. 3, 2016, both of which are entirely incorporated herein by reference.

TECHNICAL FIELD

The present disclosure relates to a technical field of data processing, and more particularly to a data processing method and device.

BACKGROUND

A photon counting detector is a detector that can distinguish energy of incident photons by the mode of photon counting, and can obtain number of photons in different energy regions in one scan.

However, the mode of photon counting is affected by a detector response. The detector response varies depending on crystal material of the detector, and generally includes K-shell electron escaping, charge sharing, and pulse stacking. In order to take advantage of the photon counting detector, it is necessary to model and calibrate the detector response. There is no mature method at present.

SUMMARY

An embodiment of the present disclosure provides a data processing method, comprising steps of: performing detector response calibration based on a detector response obtained by an incidence of rays with known energy into a detector to obtain a detector response model; obtaining a photon counting model of the detector between incident energy spectrum data of the detector and detected energy spectrum data of the detector based on the detector response model; and performing a deconvolution operation on counts of photons in respective energy regions in the detected energy spectrum data of the detector based on the photon counting model of the detector, to obtain real counts of photons in respective energy regions in the incident energy spectrum data of the detector.

In some embodiments, wherein the deconvolution operation is performed on the counts of photons in respective energy regions in the detected energy spectrum data of the detector for each detector unit and each incident angle based on the photon counting model of the detector, to obtain real counts of photons in respective energy regions in the incident energy spectrum data of the detector for each detector unit and each incident angle, wherein all sets of the obtained data are combined to achieve multiple-energy region reconstruction of attenuation coefficient of a substance under inspection detected by the detector.

In some embodiments, wherein the deconvolution operation is performed on the counts of photons in respective energy regions in the detected energy spectrum data of the detector by a method of direct solution and adding a constraint term, to obtain the real counts of photons in respective energy regions in the incident energy spectrum data of the detector.

In some embodiments, wherein the deconvolution operation is performed on the counts of photons in respective energy regions in the detected energy spectrum data of the detector by an EM solution method, to obtain the real counts of photons in respective energy regions in the incident energy spectrum data of the detector.

In some embodiments, wherein the step of performing the detector response calibration comprises a step of simulating an energy deposition process in a photon detector of the rays with known energy according to metal fluorescence data.

In another aspect, the embodiments of the present disclosure provides a data processing device comprising: a calibrating module, configured for performing detector response calibration based on a detector response obtained by an incidence of rays with known energy into a detector to obtain a detector response model; a photon counting model obtaining module, configured for obtaining a photon counting model of the detector between incident energy spectrum data of the detector and detected energy spectrum data of the detector based on the detector response model; and a count of photons obtaining module, configured for performing a deconvolution operation on counts of photons in respective energy regions in the detected energy spectrum data of the detector based on the photon counting model of the detector, to obtain real counts of photons in respective energy regions in the incident energy spectrum data of the detector.

In some embodiments, the device further comprises a multiple-energy region reconstruction module configured for performing the deconvolution operation on the counts of photons in respective energy regions in the detected energy spectrum data of the detector for each detector unit and each incident angle based on the photon counting model of the detector, to obtain real counts of photons in respective energy regions in the incident energy spectrum data of the detector for each detector unit and each incident angle, and combining all sets of the obtained data to achieve multiple-energy region reconstruction of attenuation coefficient of a substance under inspection detected by the detector.

In some embodiments, the count of photons obtaining module of the device is further configured for performing the deconvolution operation on the counts of photons in respective energy regions in the detected energy spectrum data of the detector by a method of direct solution and adding a constraint term, to obtain the real counts of photons in respective energy regions in the incident energy spectrum data of the detector.

In some embodiments, the count of photons obtaining module of the device is further configured for performing the deconvolution operation on the counts of photons in respective energy regions in the detected energy spectrum data of the detector by an EM solution method, to obtain the real counts of photons in respective energy regions in the incident energy spectrum data of the detector.

In some embodiments, the calibrating module of the device is configured for performing the detector response calibration by simulating an energy deposition process in a photon detector of the rays with known energy according to metal fluorescence data.

In another aspect, the embodiments of the present disclosure provides a data processing device, comprising: a memory; and a processor coupled to the memory, wherein the processor is configured for: performing detector response calibration based on a detector response obtained by an incidence of rays with known energy into a detector to obtain a detector response model; obtaining a photon counting model of the detector between incident energy spectrum data of the detector and detected energy spectrum data of the detector based on the detector response model; and performing a deconvolution operation on counts of photons in respective energy regions in the detected energy spectrum data of the detector based on the photon counting model of the detector, to obtain real counts of photons in respective energy regions in the incident energy spectrum data of the detector.

According to an embodiment of the present disclosure, a deconvolution operation is performed on detected energy spectrum data of the detector by establishing a detector response model to obtain a real count of photons in an energy region in the energy spectrum data, thereby eliminating the effect of the photon counting detector response on the count of photons and obtaining true attenuation coefficient of each substance.

BRIEF DESCRIPTION OF THE DRAWINGS

Features and advantages of the present disclosure will be more clearly understood from the description of the accompanying drawings, in the drawings.

DETAILED DESCRIPTION

Figure 1:
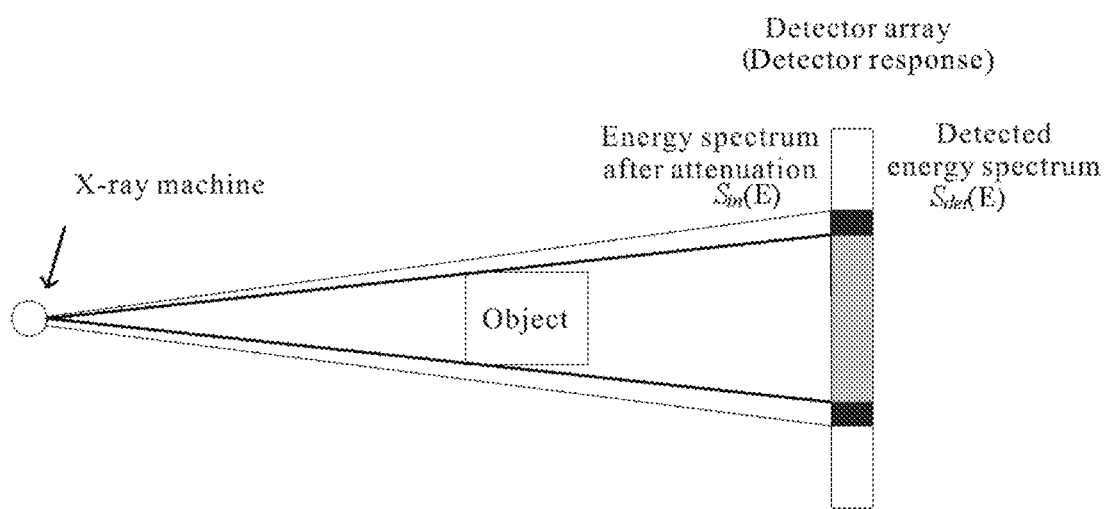
FIG. 1 is a schematic view showing an application scenario of a data processing method according to some embodiments of the present disclosure.

Features and exemplary embodiments of various aspects of a data processing method and device provided by the present disclosure are described in detail below. In the following detailed description, numerous specific details are set forth to provide a thorough understanding of the present disclosure. It will be apparent to those skilled in the art, however, that the present disclosure may be practiced without some of these details. The following description of the embodiments is merely to provide a better understanding of the present disclosure by way of example. The present disclosure is in no way limited to any of specific arrangements and methods disclosed herein, but covers any modifications, substitutions and improvements of elements, components and algorithms without departing from the spirit of the present disclosure. In the drawings and the following description, well-known structures and techniques are not shown in order to avoid unnecessarily obscuring the present disclosure.

A data processing method and a data processing device according to an embodiment of the present disclosure will be described in detail below with reference to the accompanying drawings.

FIG. 1 is a schematic view showing an application scenario of a data processing method according to some embodiments of the present disclosure. As shown in FIG. 1, a ray source, such as an X-ray machine, and a detector array are disposed on opposite sides of an object under inspection. After the X-ray machine projects the object under inspection, the detector array receives an X-ray spectrum after attenuation by the object under inspection. Due to a detector response, there is a certain error between an energy spectrum detected by the detector array and an energy spectrum actually after attenuation by the object under inspection. The energy spectrum here actually after attenuation by the object under inspection can also be referred to as an incident energy spectrum of the detector.

Figure 2:
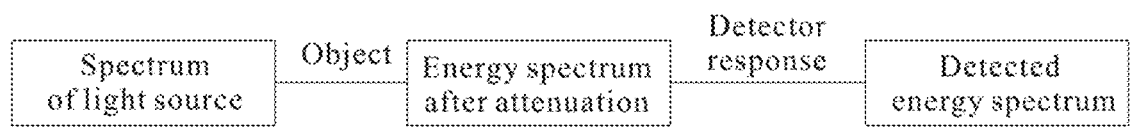
FIG. 2 is a flow chart of detecting object projection performed by the X-ray machine in the application scenario of the data processing method shown in FIG. 1 according to some embodiments of the present disclosure.

FIG. 2 is a flow chart of detecting object projection performed by the X-ray machine in the application scenario of the data processing method shown in FIG. 1, according to some embodiments of the present disclosure. Referring to FIG. 2, the X-ray machine emits a continuous spectrum of a light source, of which an energy spectrum after attenuation is obtained by attenuation via the object. The energy spectrum after attenuation is incident on the detector, and is converted into an electrical signal by interaction of detector crystal with incident photons, which is then read by subsequent electronic components, thereby obtaining a detected energy spectrum of the detector.

Figure 3:
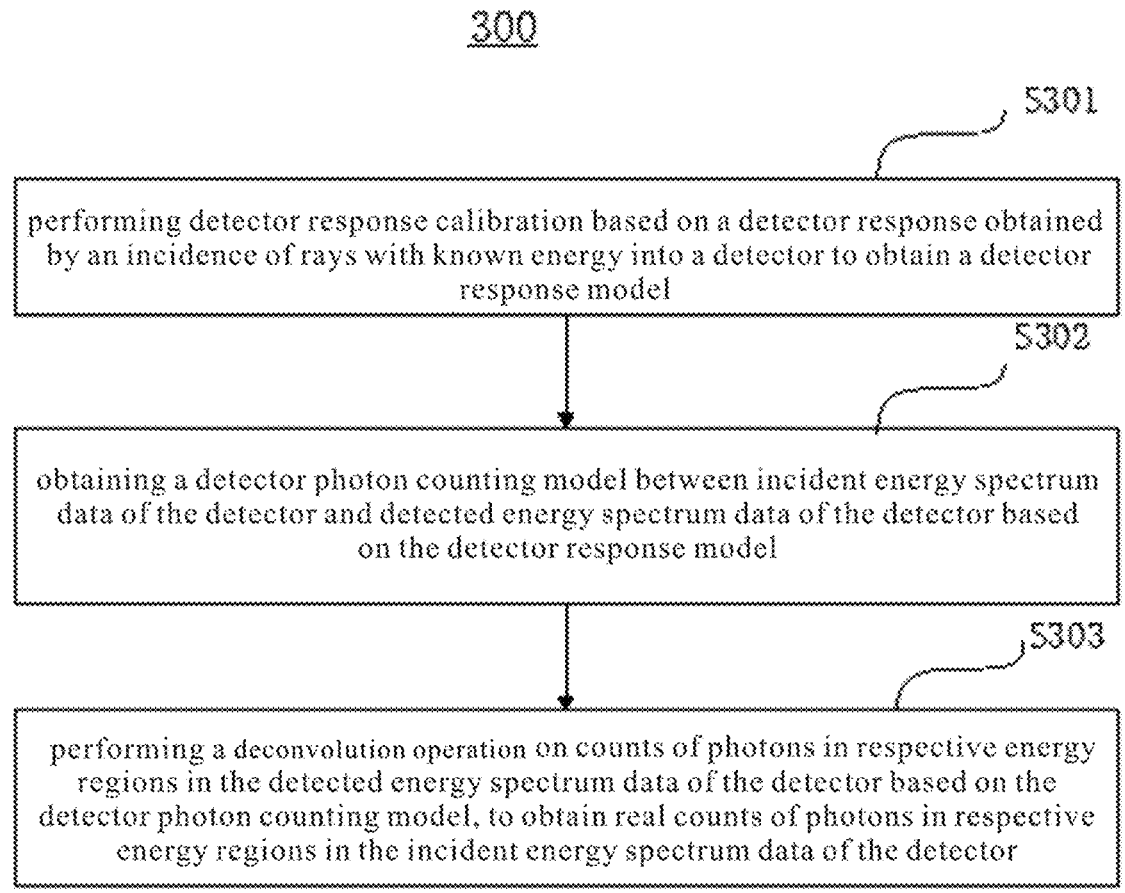
FIG. 3 is a flow chart of a data processing method according to some embodiments of the present disclosure.

Referring to FIG. 3, some embodiments of the present disclosure provides a flow chart of a data processing method. The data processing method 300 includes the following steps: at step S301, performing a detector response calibration based on a detector response obtained by an incidence of rays with known energy into a detector, to obtain a detector response model; at step S302, obtaining a photon counting model of the detector between incident energy spectrum data of the detector and detected energy spectrum data of the detector, based on the detector response model; at step S303, performing a deconvolution operation on counts of photons in respective energy regions in the detected energy spectrum data of the detector based on the photon counting model of the detector, to obtain real counts of photons in respective energy regions in the incident energy spectrum data of the detector.

At step S301, the detector response calibration can be understood as determining a relationship between an input and an output of the detector. The detector response calibration is used to obtain the detector response model, which is a basis for subsequent deconvolution on the count of photons in the energy region. It should be understood that an energy deposition process in the detector can be simulated by the incidence of the rays with known energy into the detector, so as to perform the detector response calibration. In some exemplary embodiments, the detector response calibration may be performed by, for example, using metal fluorescence. In some exemplary embodiments, the detector response calibration may also be performed by using other forms of rays with known energy, such as a synchrotron radiation light source, a radiation source. Please also refer to FIG. 4, which shows a schematic view of a spectrum obtained by a detector when detecting a fluorescence spectrum of a metal according to the embodiment.

Figure 4:
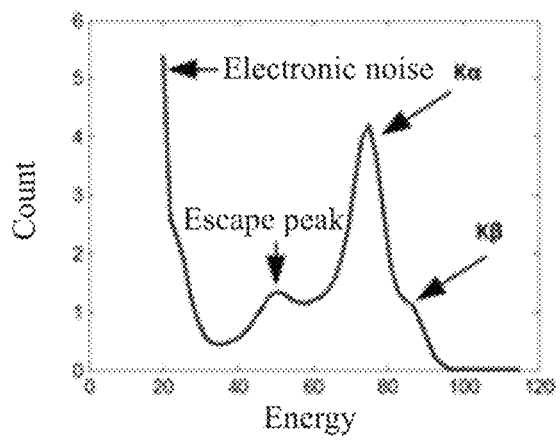
FIG. 4 is a schematic view showing a spectrum obtained by a detector when detecting a fluorescence spectrum of a metal according to some embodiments of the present disclosure.

At step S302, for example, a combination of Monte Carlo simulation and metal fluorescence data can be utilized for a detector modeling to construct the detector response model. In a process of utilizing the combination of Monte Carlo simulation and metal fluorescence data for the detector modeling, metal fluorescence refers to characteristic rays emitted from a substance when it is irradiated by X-rays and electrons in an outer shell is de-excited to an inner shell. This characteristic rays are used to approximate incident monochromatic rays of the detector, and then the detector response calibration is performed. As shown in FIG. 4, which is a response of a typical CdTe to the fluorescence spectrum of lead, where an abscissa indicates photon energy in 1000 eV, expressed in keV; and an ordinate indicates count of photons. Fluorescence refers to a process of characteristic X-ray release of a substance under X-ray irradiation, where a series of X-rays with a certain energy is released. Both $k_\alpha$ and $k_\beta$ are characteristic X-rays released by the lead during exposure, and a proportion of $k_\beta$ ray is very low. The energies of the characteristic X-rays are known and can be used to calibrate the detector response. It can be seen from FIG. 4 that in detected data of the detector, the count of photons is highest in the energy region of 0-20, which is the response of electronic noise, and a peak of photons appears in the energy region of 20-40, which is caused by electron escape. The fluorescence spectra of some commonly used materials with characteristic X-rays of different energy are given in Table 1.

TABLE 1

| element | $K_{\alpha 1}$/keV | $K_{\alpha 2}$/keV | $K_{\beta 1}$/keV | $K_{\beta 2}$/keV |
|---|---|---|---|---|
| La | 33.440 | 33.033 | 37.799 | 38.728 |
| Ce | 34.717 | 34.276 | 39.255 | 40.231 |
| Nd | 37.359 | 36.845 | 42.269 | 43.298 |
| Gd | 42.983 | 42.280 | 48.718 | 49.961 |
| Er | 49.099 | 48.205 | 55.690 | 57.088 |
| W | 59.310 | 57.973 | 67.233 | 69.090 |

TABLE 1-continued

| element | $K_{\alpha 1}$/keV | $K_{\alpha 2}$/keV | $K_{\beta 1}$/keV | $K_{\beta 2}$/keV |
|---|---|---|---|---|
| Pt | 66.820 | 65.111 | 75.236 | 77.866 |
| Pb | 74.957 | 72.794 | 84.922 | 84.343 |

Figure 5:
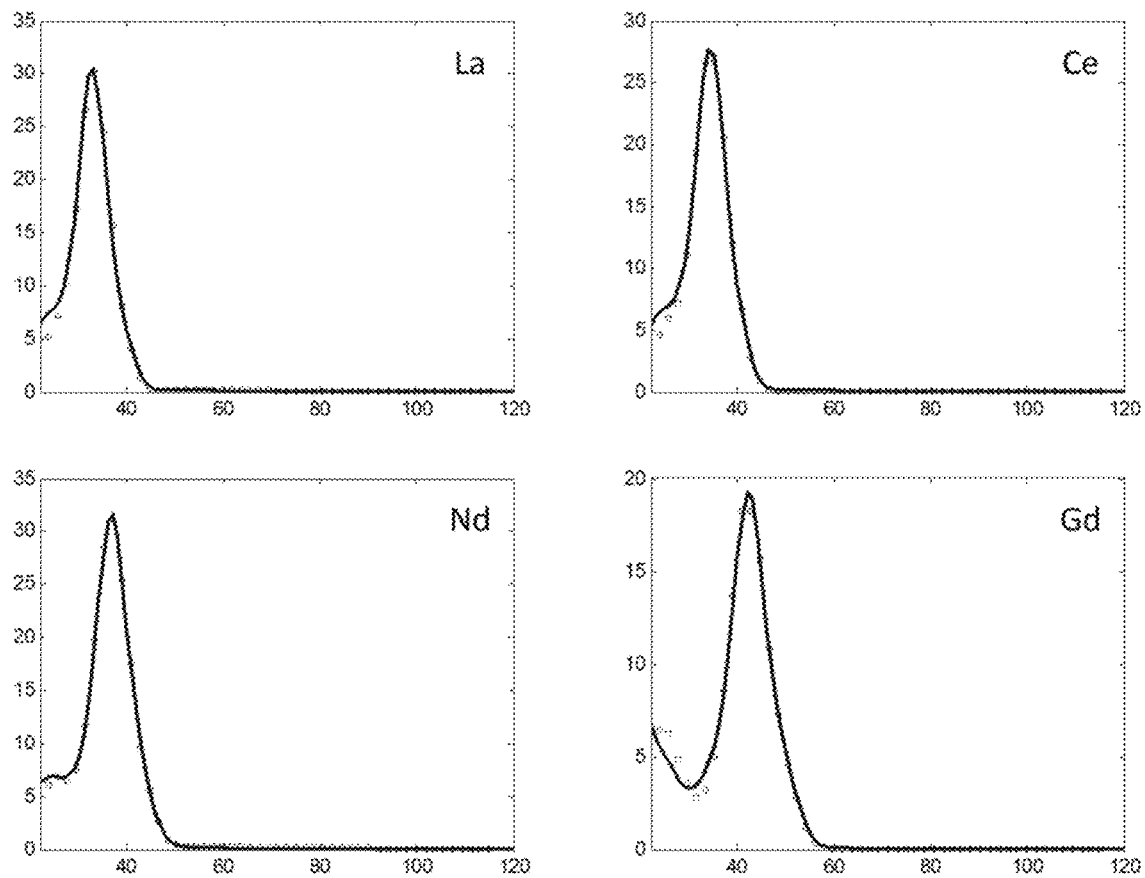
FIG. 5 illustrates a comparison between data actually detected by incidence of rays with known energy into a detector and data obtained by simulation by using detector response model according to some embodiments of the present disclosure.

The Monte Carlo simulation can include an entire process from an electron beam impinging a target to the energy deposition of the photons in the detector. For example, a Monte Carlo simulation can be carried out with C++ and GEANT4, and the entire process can be divided into three sub-processes and thus includes three sub-steps: a step of electron beam impinging the target and generation of energy spectrum; a step of simulation of photon transport process and establishment of a transport matrix under isotropic conditions; and a step of energy deposition of monochromatic rays in a photon counting detector, thereby obtaining an energy spectrum of the incident photons of the detector. It can be understood that an energy distribution of the X-rays generated at a certain voltage is a continuous band, and the monochromatic rays have one band and one central value. The detector model mainly aims to determine the detector response for the incident monochromatic spectrum, denoted as $\delta(E_0)$ (which can be understood as the detector response for the incident monochromatic rays with an energy $E_0$), and may include establishment of a mapping relationship between threshold of the detector and energy of incident photons, and determination of parameters of spectrum broadening. For example, a Gaussian diffusion model can be used to simulate a diffusion of electron-hole pairs, as shown in equation (1), $$\sigma = \sigma_0 \left(1 - \frac{z}{D}\right)^{\frac{1}{2}} \quad (1)$$

wherein $\sigma$ is a standard deviation of the Gaussian model, $\sigma_0$ is a preset constant, z and D respectively are a position where photons interact with the detector crystal and a crystal depth. It can be seen that the closer the position where interaction occurs to D, the narrower the broadening. The broadening of an approximate linear spectrum with energy and a mapping between a voltage threshold of the detector and photon energy is shown in equations (2) and (3), $$\sigma_s^2 = p_{s1} 33 \, E + p_{s2} \quad (2)$$

$$E = p_1 \times TH + p_2 \quad (3)$$

wherein $\sigma_s$ is the broadening of the deposited photons, TH is a threshold of the detector and E is energy of photons. The incident energy spectrum $S_{in}(E)$ of the detector can be obtained by the Monte Carlo simulation, and then real detected energy spectrum $S_{det}(E)$ of the detector can be used to determine the specific parameters $p_{s1}$、$p_{s2}$、$p_1$ and $p_2$ in the detector response model. For example, differential evolution algorithm can be used to obtain optimized parameters in the detector response model, wherein the elements in Table 1 can be selected. FIG. 5 illustrates a comparison between data actually detected by incidence of rays with known energy into a detector and data obtained by simulation using the detector response model, according to some embodiments of the present disclosure. As shown in FIG. 5, La, Ce, Nd and Gd are taken as examples, the Monte Carlo and the detector response model with optimized parameters are used to perform the simulation, and wherein an abscissa indicates photon energy in keV; and an ordinate indicates count of photons. Hollow points represent the detected data, and curves represent results of simulations by use of the Monte Carlo and the detector response model with the optimized parameters.

At the step S303, the detector response model constructed in the step S302 can be described by h(E;E'), which is a concept similar to a probability distribution and can be understood as a probability that a photon with energy E' is recorded as energy E. Since the energy spectrum after attenuation, that is, the incident energy spectrum of the detector is denoted as $S_{in}(E')$, and the detected photon is denoted as $S_{det}(E)$, the detector response photon counting model can be expressed as follows:

$$S_{det}(E) = \int_{E'} S_{in}(E') \cdot h(E; E') dE' \qquad (4)$$

wherein the equation (4) represents a convolutional form of the detector response model, and the deconvolution means to obtain $S_{in}(E')$ from $S_{det}(E)$ based on the detector response model. Energy spectrum deconvolution has a very ill-posed problem, especially in energy spectrum CT which has a small number of energy regions. It should be understood that, a larger number of energy regions means a narrower width of the energy region, and it means a smaller count of photons in each energy region under the same scanning conditions, which will be affected by noise in a greater extent. For the method of deconvolution on counts of photons in limited number of energy regions to obtain the entire spectrum data, the data is very unstable. Here, the deconvolution is performed on a wide-energy region to obtain count of photons in the energy region instead of count of photons in the energy spectrum. That is, when performing deconvolution on the counts of photons in respective energy regions in the detected energy spectrum data of the detector, it is required to obtain real counts of photons in the energy regions instead of that of the entire energy spectrum. Therefore, the number of unknowns is reduced, stability of the algorithm is improved, and practicability of the data processing method is also taken into consideration.

In an embodiment, the method 300 may perform the deconvolution operation on the counts of photons in respective energy regions in the detected energy spectrum data for each detector unit and each incident angle of the detector, based on the photon counting model of the detector, to obtain real counts of photons in respective energy regions in the incident energy spectrum data of the detector for each detector unit and each incident angle. All sets of the obtained data may be combined to achieve a multiple-energy region reconstruction of an attenuation coefficient of the material under inspection detected by the detector. It can be understood that the deconvolution may be performed on the counts of photons in respective energy regions for each detector unit and each incident angle obtained during scanning of the detector to remove detector response, by which a real spectrum after attenuation of the spectrum penetrating through the material can be substantially obtained.

In an example, the photon counting detector can simultaneously obtain counts of photons in many energy regions, and energy data in different energy regions, for example, the counts of a particular pixel in sonograms which indicate the relationships between the incident angle, detector unit and photon counts, form an energy spectrum. The deconvolution operation can be performed on each detector unit one by one to obtain a sinogram sequence after deconvolution, which can be directly used for the multiple-energy region reconstruction of the detector to obtain quantitative CT.

In an embodiment, the step S303 of the method may perform deconvolution operation on the counts of photons in respective energy regions in the detected energy spectrum data of the detector by iterative update, to obtain the real counts of photons in respective energy regions in the incident energy spectrum data of the detector. Here, since it is necessary to continue to obtain the detector response of energy region based on the calibrated monochromatic detector response, the detector response of energy region should be an average of all the monochromatic detector responses contained in the energy region. For example, it can be expressed by equation (5), $$H_k(E) = \sum_{i \in \zeta_k} \alpha_i h(E; E_i) \qquad (5)$$

wherein $\zeta_k$ represents a set of single energy points contained in the kth energy region, the number of energy elements contained in the kth energy region is denoted as $N_k$, and $$\sum_i \alpha_i = 1,$$

which is a weighted average factor, can be adjusted based on different priors and for example, can be a value of $1/N_k$, which can be understood as that the total counts of photons in the energy region is assumed to be evenly distributed at various points. The equation (4) is discretized to obtain equation (6), $$y = \vec{N}_{det} = \sum_{i=1}^{n} x_n \cdot H_i[m] = A \cdot x \qquad (6)$$

wherein $x_n$ represents the count of photons of the incident spectrum at each energy, $H_i[m]$ is a discrete expression of the detector response function corresponding to the energy, and y is the counts of photons in respective energy regions detected by the detector. The expression can be matrixed, then $x = [x1, x2, \ldots, xn]^T$ represents the real counts of photons in respective energy regions. Each column of A represents the detector response of the corresponding energy region, and y still represents the detected counts of photons in respective energy regions. The iterative update method may use, for example, an EM algorithm (also referred to as an Expectation Maximization Algorithm). Here, the iterative update method for finding x from y and A is as shown in equation (7):

$$x_n^{(k+1)} = x_n^{(k)} \frac{\sum_m (A^T)_{nm} \left( y_m / \sum_{n'} A_{mn'} C_{n'}^{(k)} \right)}{\sum_m (A^T)_{nm}} \qquad (7)$$

In order to improve the stability of the algorithm, and for counting characteristics of the photon counting detector and specific application scenarios, the EM algorithm is selected to perform the deconvolution on wide-energy region to obtain count of photons in the energy region instead of that in the energy spectrum. The EM algorithm itself is an algorithm that is relatively robust to noise, and thus stability of the data processing method can be improved. The deconvolution operation is performed with EM algorithm on the counts of photons in respective energy regions for each detector unit and each angle obtained by the detector during scanning process to remove the detector response, and relative standard deviation of total counts of photons with different widths of energy regions obtained by tests is given in Table 2.

TABLE 2

| | Width of Energy Window | | |
|---|---|---|---|
| | 5 keV | 7 keV | 10 keV |
| Relative Standard Deviation | 0.11% | 0.096% | 0.11% |

Referring to Table 2, the deconvolution operation on the photon counting model by use of other methods, can only grantee data after process to be relatively stable under the width of energy region of at most 4 keV. With the deconvolution operation on the photon counting model by use of the EM solution method, the deviation of the total count is 0.11% under the width of energy region of 10 keV, which achieves a data processing effect by use of the other methods under the width of energy region of 4 keV. It can be seen that, the spectrum after attenuation, that is, the incident spectrum data of the detector containing real attenuation information of material can be obtained by performing the deconvolution operation on the photon counting model by use of the EM solution method, and the data result is very stable.

Figure 6A:
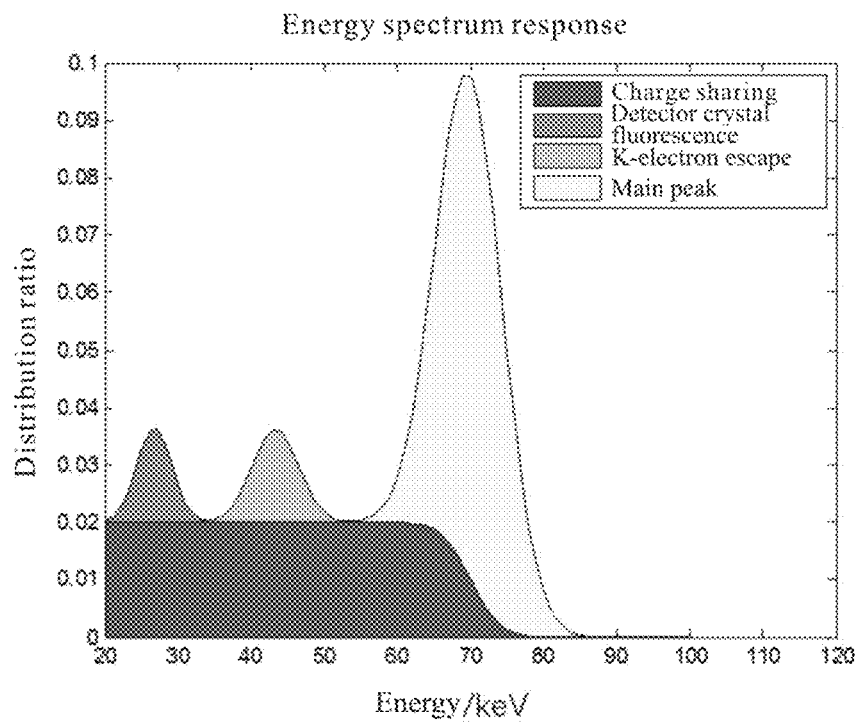
FIG. 6a is a schematic view showing a distribution ratio of photons in respective energy regions detected by a detector in a simulation of a data processing method according to some embodiments of the present disclosure.
Figure 6B:
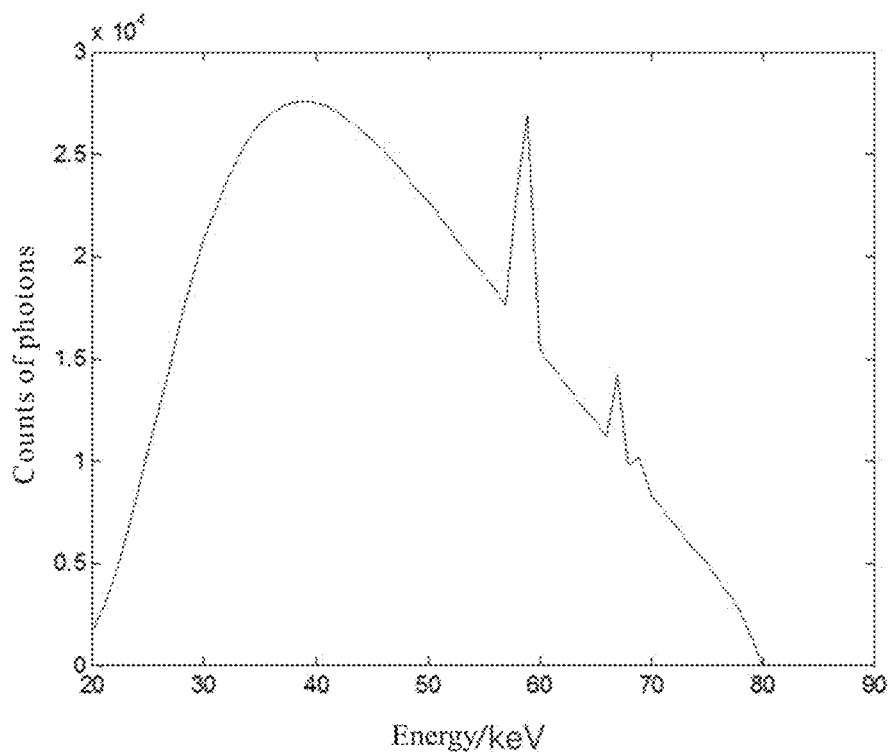
FIG. 6b is a schematic view showing an energy spectrum actually input into a detector in a simulation of a data processing method according to some embodiments of the present disclosure.
Figure 6C:
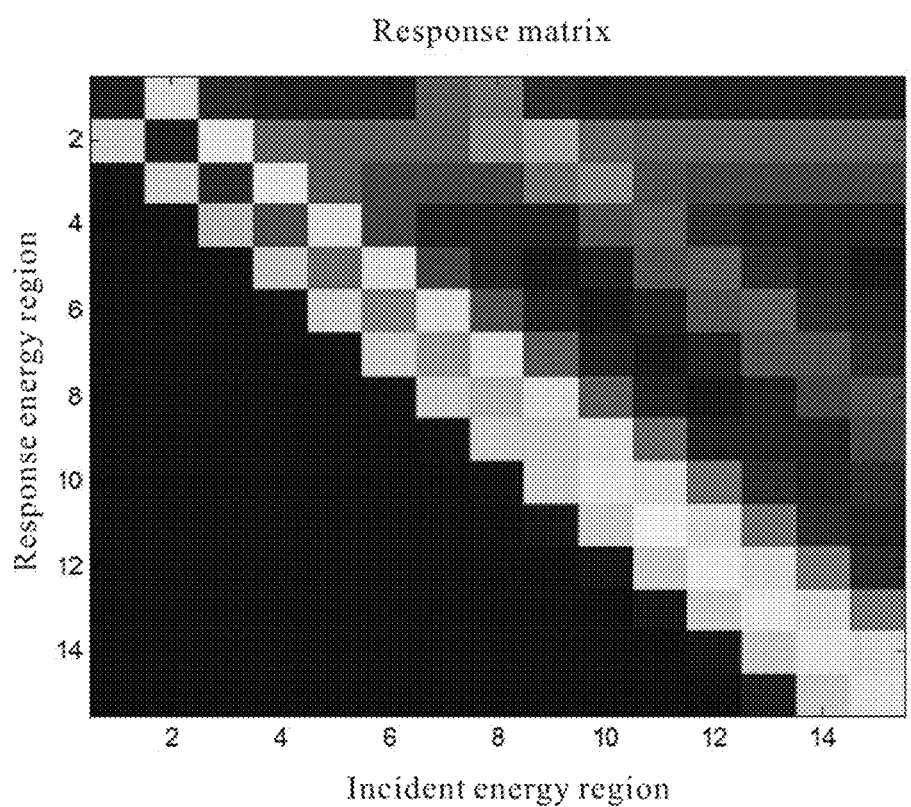
FIG. 6c is a schematic view showing a response matrix of a detector in a simulation of a data processing method according to some embodiments of the present disclosure.
Figure 6D:
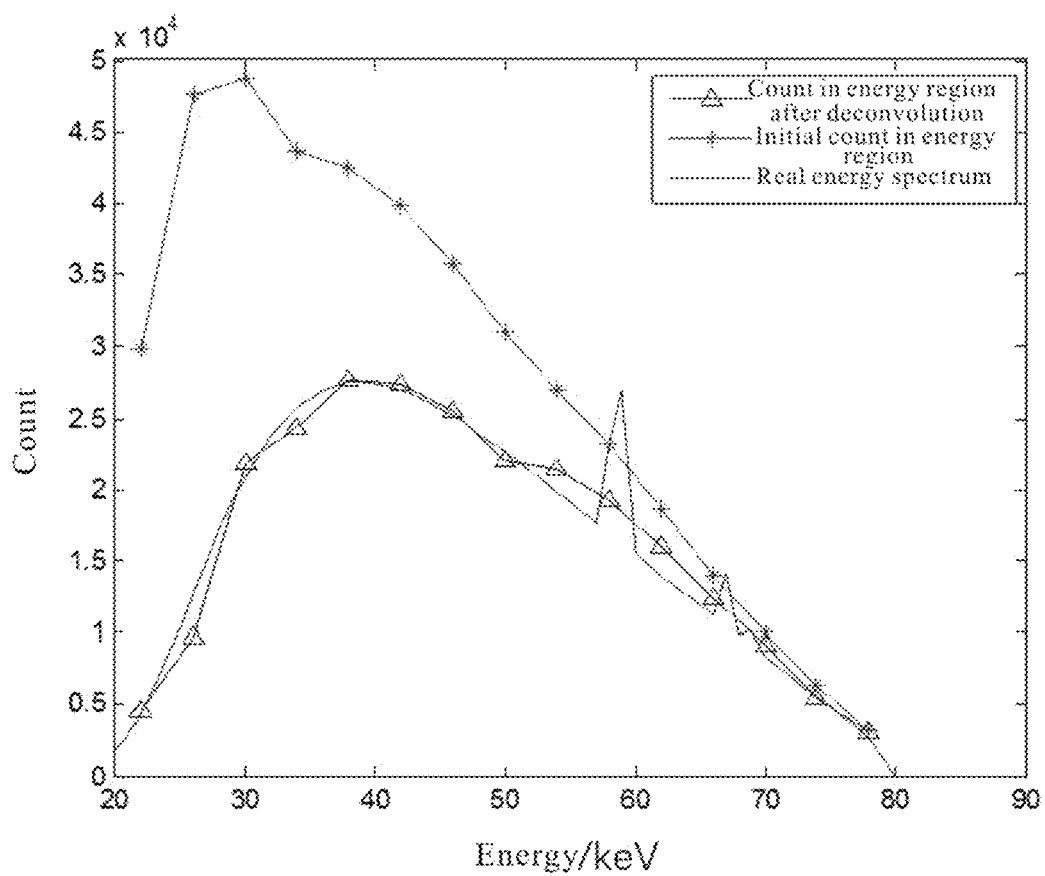
FIG. 6d is a schematic view showing an incident energy spectrum of a detector obtained in a simulation of a data processing method according to some embodiments of the present disclosure.

FIG. 6a is a schematic view showing a distribution ratio of photons in respective energy regions detected by a detector in a simulation of a data processing method according to an embodiment of the present disclosure. FIG. 6b is a schematic view showing an energy spectrum actually input to a detector in a simulation of a data processing method according to an embodiment of the present disclosure. FIG. 6c is a schematic view showing a response matrix of a detector in a simulation of a data processing method according to an embodiment of the present disclosure. FIG. 6d is a schematic view showing an incident energy spectrum of a detector obtained in a simulation of a data processing method according to an embodiment of the present disclosure. As shown in FIG. 6a, in one test, a distribution ratio of photons in respective energy regions with an incident energy E' of 70 keV is simulated, wherein an abscissa represents photon energy in keV and an ordinate represents a distribution ratio of collected photons in each energy region, and an effect of deconvolution can be seen very clearly. FIG. 6b represents an incident energy spectrum of the detector, and FIG. 6c is a detector response matrix A, each column of which is shaped as the detector response function of FIG. 6a. As shown in FIG. 6a, electrons generated by photons in the detector crystal boundary might spread to several detector crystal units, and thus each detector crystal unit receives only a part of electrons, resulting in the electronic sharing, due to which, a ratio of the detector response in the energy region of 20-70 is 0.02; a ratio of the detector response recorded by the detector unit in the energy region of 20-30 of photon energy caused by fluorescence of other detector crystal units is between 0.03-0.04; and a ratio of the detector response recorded in the energy region of 20-30 of the photon energy caused by electron escape is between 0.03-0.04. A thin solid line in FIG. 6d is exactly the same as that in FIG. 6b which represents a real incident energy spectrum, a star line represents energy spectrum actually detected by the detector, and a triangle line represents an incident energy spectrum obtained by deconvolution using EM algorithm. It can be seen from FIG. 6d that the deconvolution operation substantially restores real appearance of the incident energy spectrum.

In an embodiment, at the step S303 of the method, the deconvolution operation may be performed on the counts of photons in respective energy regions in the detected energy spectrum data of the detector by a direct solution method, to obtain the real counts of photons in respective energy regions in the incident energy spectrum data of the detector. It should be understood that the direct solution method is a method for solving an inverse matrix, and for example, the least squares method can be used to solve a real energy spectrum vector x as shown in equation (8):

$$\min_i \| y - A \times x \|_2 \tag{8}$$

and thus x has an analytical solution as shown in equation (9):

$$x = (A^T \times A)^{-1} \times A^T \times y \tag{9}$$

Since A is a highly singular matrix, such a solution method cannot find the real energy spectrum in the presence of noise. In practice, the energy spectrum is generally continuous, and thus a continuity constraint can be added, as shown in equation (10):

$$k_1(x_1-x_2)^2 + k_2(x_2-x_3)^2 + \ldots + k_{n-1}(x_{n-1}-x_n)^2 \tag{10}$$

By the matrix description, the equation (10) can be written as equation (11):

$$|C \times x|^2 \tag{11}$$

wherein C is a continuity matrix. After adding the continuous constraint term, the solution function can be written as equation (12):

$$\min_{spe}(|y - A \times x|^2 + |C \times x|^2) \tag{12}$$

The analytical solution of the energy spectrum x can be written as (13):

$$x = (A^T \times A + C^T \times C)^{-1} \times A^T \times y \tag{13}$$

Thereby, the real counts of photons in respective energy regions in the incident energy spectrum data of the detector can be obtained. The method is simple in solving, ensures continuity and meanwhile ensures a value of small error. The real spectrum after attenuation of a spectrum penetrating through the substance can be substantially obtained by this method.

Figure 7:
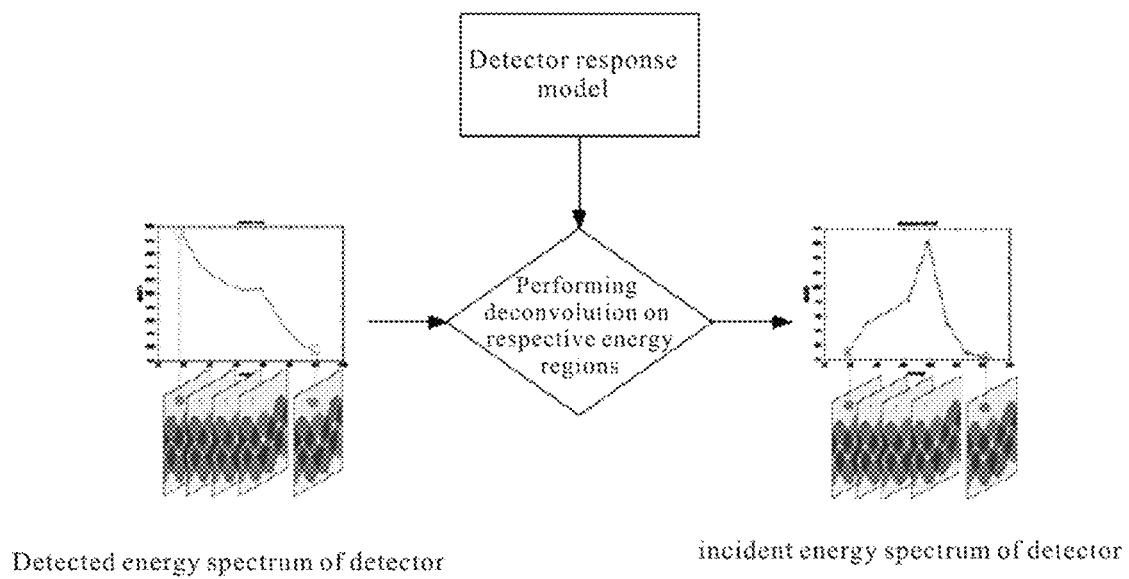
FIG. 7 is a schematic view showing a data processing method according to some embodiments of the present disclosure.

Referring to FIG. 7, a series of sinograms after deconvolution can be obtained by performing deconvolution on sinograms of respective energy regions for one detector unit after another, according to the data processing method according to an embodiment of the present disclosure. The sinograms shown in FIG. 7 show counts of photons with the detector response removed and containing real attenuation information. After obtaining the sinograms after deconvolution, the sinograms after deconvolution can be used for CT reconstruction, which herein can be understood as a multiple-energy region reconstruction on the attenuation coefficient of the material under inspection detected by the detector. The CT reconstruction may be performed using an analytical reconstruction method, such as the FDK method, or using an iterative reconstruction method, such as the ART method.

Figure 8A:
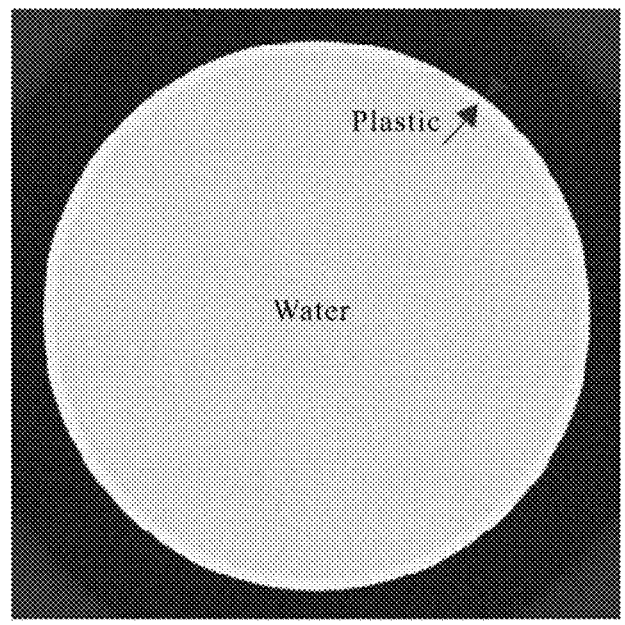
FIG. 8a is a schematic view showing a distribution of a substance under inspection based on a data processing method according to some embodiments of the present disclosure.
Figure 8B:
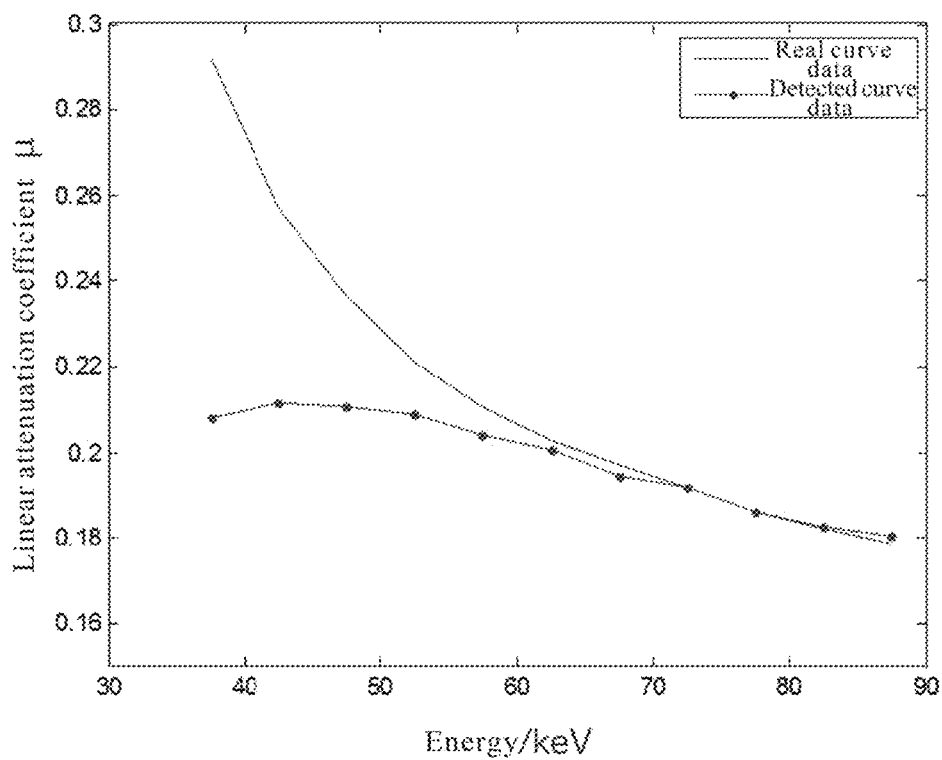
FIG. 8b illustrates a plot of an attenuation coefficient of material prior to be processed detected by a detector tested according to a data processing method according to some embodiments of the present disclosure.
Figure 8C:
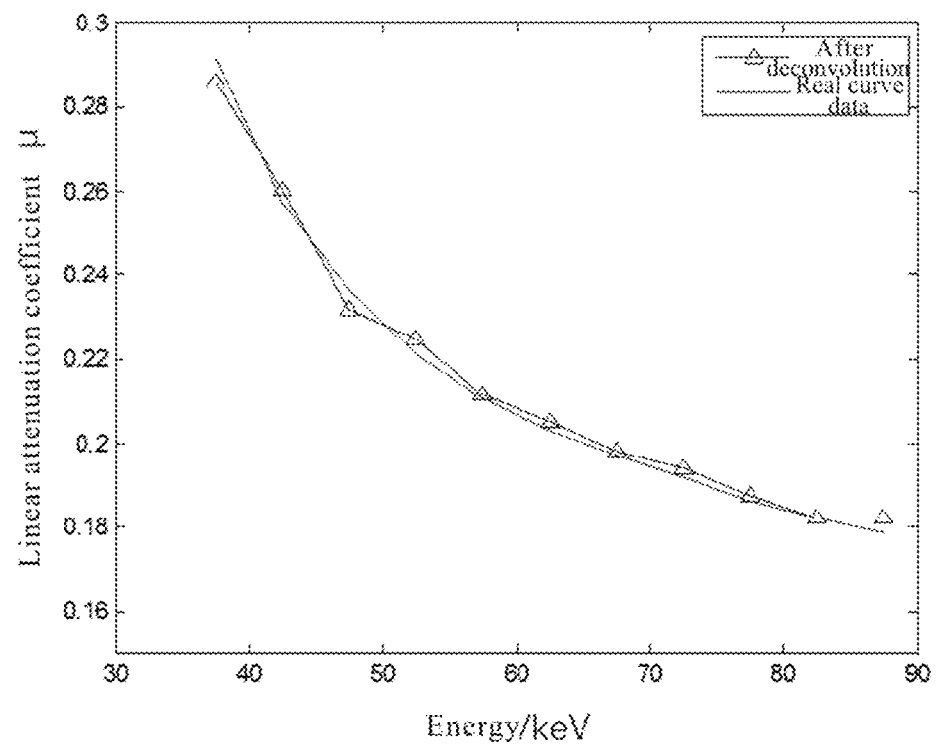
FIG. 8c illustrates a plot of an attenuation coefficient of material after processed obtained and tested according to a data processing method according to some embodiments of the present disclosure.

As an example, plastic bottled water is selected as an object under inspection to be projected and verify the data processing effect of the data processing method. As shown in FIG. 8a, in one test, a model of the plastic bottled water is established by the detected energy spectrum data via a multiple-energy region reconstruction performed by the method. As shown in FIG. 8b (wherein an abscissa represents photon energy in keV, and an ordinate represents attenuation coefficient of rays in respective energy regions), if the attenuation coefficient of water is obtained by directly reconstructing on the sinogram of each energy region without performing the deconvolution operation on the detected energy spectrum data of the detector for respective energy regions, the detected curve data deviates from the value of theoretical real curve data, because of the presence of the detector response. However, as shown in FIG. 8c, for the attenuation coefficient in respective energy regions reconstructed after the deconvolution operation, the detected data is substantially coincident with the value of the theoretical real curve data.

Figure 9:
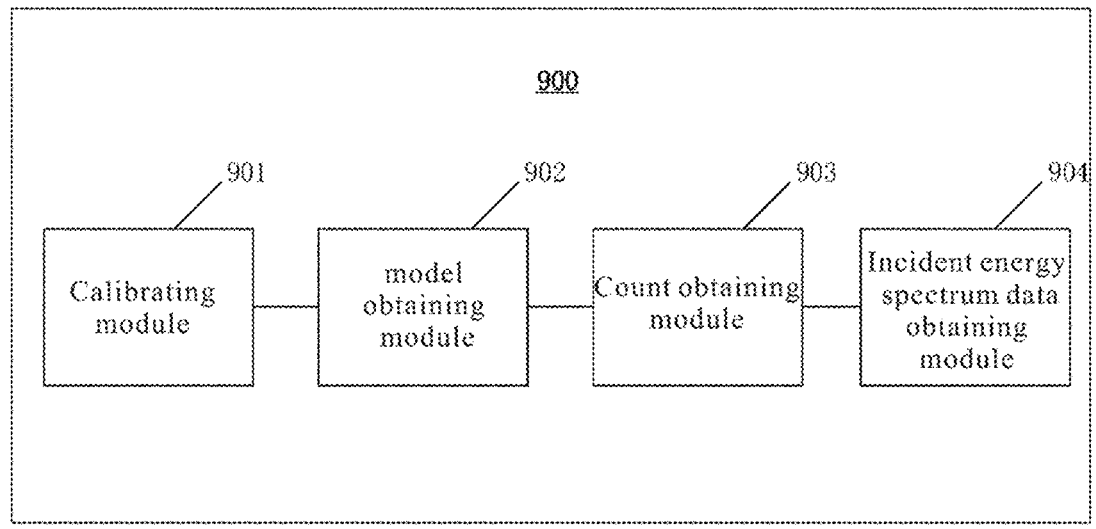
FIG. 9 is a schematic view showing a structure of a data processing device according to some further embodiments of the present disclosure.

FIG. 9 is a schematic view showing a structure of a data processing device 900 according to other embodiments of the present disclosure. As shown in FIG. 9, the data processing device 900 includes a calibrating module 901, a photon counting model obtaining module 902, a count of photons obtaining module 903, and an incident energy spectrum data obtaining module 904. The calibrating module 901 is configured to perform a detector response calibration based on a detector response obtained by an incidence of rays with known energy into a detector, to obtain a detector response model. The photon counting model obtaining module 902 is configured to obtain a photon counting model of the detector between incident energy spectrum data of the detector and detected energy spectrum data of the detector based on the detector response model. The count of photons obtaining module 903 is configured to perform a deconvolution operation on counts of photons in respective energy regions in the detected energy spectrum data of the detector based on the photon counting model of the detector, to obtain real counts of photons in respective energy regions in the incident energy spectrum data of the detector.

In an embodiment, the device further includes a multiple-energy region reconstruction module configured for performing the deconvolution operation on the counts of photons in respective energy regions in the detected energy spectrum data of the detector for each detector unit and each incident angle based on the photon counting model of the detector, to obtain real counts of photons in respective energy regions in the incident energy spectrum data of the detector for each detector unit and each incident angle, and combining all sets of the obtained data to achieve multiple-energy region reconstruction of attenuation coefficient of a substance under inspection detected by the detector.

In an embodiment, the count of photons obtaining module 903 of the device may perform the deconvolution operation on the counts of photons in respective energy regions in the detected energy spectrum data of the detector by a method of direct solution and adding a constraint term, to obtain the real counts of photons in respective energy regions in the incident energy spectrum data of the detector.

In an embodiment, the count of photons obtaining module 903 of the device may perform the deconvolution operation on the counts of photons in respective energy regions in the detected energy spectrum data of the detector by an EM solution method, to obtain the real counts of photons in respective energy regions in the incident energy spectrum data of the detector.

In an embodiment, the calibrating module 901 of the device may perform the detector response calibration by simulating an energy deposition process in a photon detector of the rays with known energy according to metal fluorescence data.

Figure 10:
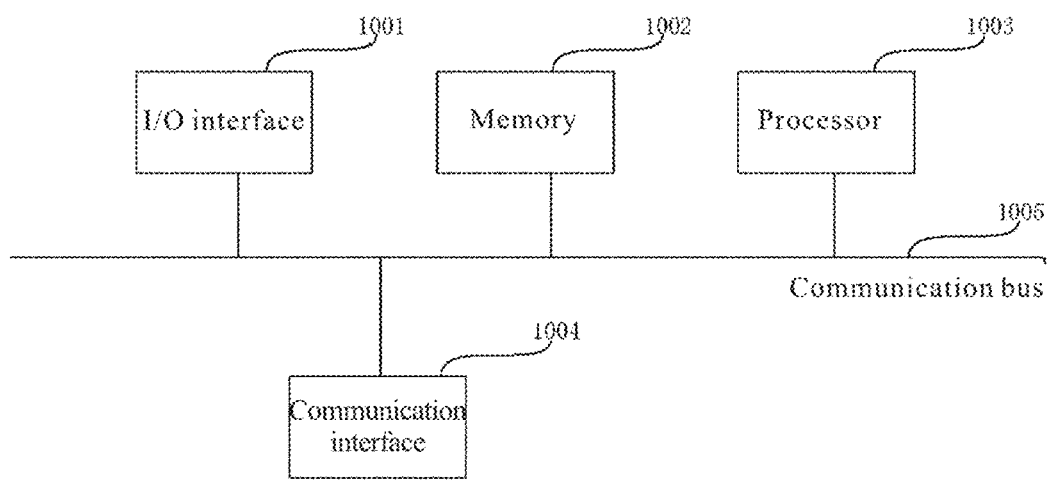
FIG. 10 is a schematic view showing a structure of a data processing device according to some other further embodiments of the present disclosure.

Please refer to FIG. 10, which is a schematic view showing a structure of a data processing device according to some embodiments of the present disclosure. The device can employ a general purpose computer system, which can be, in particular, a processor based computer. The data processing device can include an input and output I/O interface 1001, a memory 1002, at least one processor 1003, and at least one communication interface 1004. The input/output I/O interface 1001, the memory 1002, the at least one processor 1003, and the at least one communication interface 1004 are connected by a communication bus 1005. The I/O interface 1001 is configured to receive text data from a user apparatus and transmit the text data to the processor 1003, wherein the text data is represented in a form of a structured query language SQL. The processor 1003 may be a general purpose central processing unit (CPU), a microprocessor, an application-specific integrated circuit (ASIC), or one or more integrated circuits for controlling execution of programs of the present disclosure. The communication bus 1005 can include a path for communicating information between the components described above. The communication interface 1004 uses devices, such as any transceiver, for communicating with other devices or communication networks, such as Ethernet, Radio Access Network (RAN), and Wireless Local Area Networks (WLAN). The computer system includes one or more memories 1002, which may be, but is not limited to, read-only memory (ROM) or other types of static storage apparatuses that can store static information and instructions, random access memory (RAM) or other types of dynamic storage apparatuses that can store information and instructions, or Electrically Erasable Programmable Read-Only Memory (EEPROM), CD-ROM (Compact Disc Read-Only Memory, CD-ROM)) or other disc storage, optical disc storage (including compact discs, laser discs, optical discs, digital versatile discs, Blu-ray discs, etc.), disk storage media or other magnetic storage devices, or any other medium capable of carrying or storing desired program code in a form of instructions or data structures and can be accessed by a computer. These memories 1002 are coupled to the processor 1003 via the communication bus 1005. The memory 1002 is used to store application code for executing the solution of the present disclosure. The application code of the solution of the present disclosure is stored in a memory and controlled by the processor 1003 for execution. The processor 1003 is configured to perform the following steps including: performing detector response calibration based on a detector response obtained by an incidence of rays with known energy into a detector to obtain a detector response model; obtaining a photon counting model of the detector between incident energy spectrum data of the detector and detected energy spectrum data of the detector based on the detector response model; and performing a deconvolution operation on counts of photons in respective energy regions in the detected energy spectrum data of the detector based on the photon counting model of the detector, to obtain real counts of photons in respective energy regions in the incident energy spectrum data of the detector.

It should be noted that the term "comprising" or "including" does not exclude an element or component that is not listed in the claims. The article "a" or "an" in front of an element or component does not exclude a case where there are multiple such elements or components.

In addition, it should be noted that the language used in the specification has been selected for the purpose of readability and teaching, and is not intended to be construed as limiting the subject of the present disclosure. Therefore, many modifications and variations will be apparent to the person skilled in the art without departing from the scope of the present disclosure. The descriptions of the present disclosure are illustrative, and not restrictive, and the scope of the present disclosure is defined by the appended claims.

What is claimed is:

1. A method for detecting an attenuation coefficient of an object under inspection by use of a X-ray machine, a detector and a processor, the method comprising steps of:
    performing detector response calibration based on a detector response of the detector obtained by an incidence of rays with known energy into the detector to obtain a detector response model by the processor;
    obtaining a photon counting model of the detector between incident energy spectrum data of the detector and detected energy spectrum data of the detector based on the detector response model by the processor, the incident energy spectrum data of the detector being obtained by an X-ray spectrum from the X-ray machine, which projects the object under inspection and is attenuated by the object under inspection, and the detected energy spectrum data being an electrical signal obtained by interaction of detector crystal of the detector with photons of the incident energy spectrum and read out by electronic components of the detector; and
    performing a deconvolution operation on counts of photons in respective energy regions in the detected energy spectrum data of the detector based on the photon counting model of the detector, to obtain real counts of photons in respective energy regions in the incident energy spectrum data of the detector while not count of photons in the entire energy spectrum, by the processor,
    wherein the deconvolution operation is performed on the counts of photons in respective energy regions in the detected energy spectrum data of the detector for each detector unit and each incident angle based on the photon counting model of the detector, to obtain real counts of photons in respective energy regions in the incident energy spectrum data of the detector for each detector unit and each incident angle, by the processor, and all sets of the obtained data are combined to achieve multiple-energy region reconstruction of the attenuation coefficient of the object under inspection detected by the detector by the processor.

2. The method of claim 1, wherein the deconvolution operation is performed on the counts of photons in respective energy regions in the detected energy spectrum data of the detector by a method of direct solution and adding a constraint term, to obtain the real counts of photons in respective energy regions in the incident energy spectrum data of the detector, by the processor.

3. The method of claim 1, wherein the deconvolution operation is performed on the counts of photons in respective energy regions in the detected energy spectrum data of the detector by an EM solution method, to obtain the real counts of photons in respective energy regions in the incident energy spectrum data of the detector, by the processor.

4. The method of claim 1, wherein the step of performing the detector response calibration comprises a step of simulating an energy deposition process in a photon detector of the rays with known energy according to metal fluorescence data.

5. A device for detecting an attenuation coefficient of an object under inspection, the device comprising:
    an X-ray machine;
    a detector;
    a memory; and
    a processor coupled to the memory, wherein the processor is configured for:
        performing detector response calibration based on a detector response of the detector obtained by an incidence of rays with known energy into the detector to obtain a detector response model;
        obtaining a photon counting model of the detector between incident energy spectrum data of the detector and detected energy spectrum data of the detector based on the detector response model, the incident energy spectrum data of the detector being obtained by an X-ray spectrum from the X-ray machine, which projects the object under inspection and is attenuated by the object under inspection, and the detected energy spectrum data being an electrical signal obtained by interaction of detector crystal of the detector with photons of the incident energy spectrum and read out by electronic components of the detector; and
        performing a deconvolution operation on counts of photons in respective energy regions in the detected energy spectrum data of the detector based on the photon counting model of the detector, to obtain real counts of photons in respective energy regions in the incident energy spectrum data of the detector while not count of photons in the entire energy spectrum,
    wherein the processor is further configured for performing the deconvolution operation on the counts of photons in respective energy regions in the detected energy spectrum data of the detector for each detector unit and each incident angle based on the photon counting model of the detector, to obtain real counts of photons in respective energy regions in the incident energy spectrum data of the detector for each detector unit and each incident angle, and combining all sets of the obtained data to achieve multiple-energy region reconstruction of the attenuation coefficient of the object under inspection detected by the detector.

6. The device of claim 5, wherein the processor is further configured for performing the deconvolution operation on the counts of photons in respective energy regions in the detected energy spectrum data of the detector by a method of direct solution and adding a constraint term, to obtain the real counts of photons in respective energy regions in the incident energy spectrum data of the detector.

7. The device of claim 5, wherein the processor is further configured for performing the deconvolution operation on the counts of photons in respective energy regions in the detected energy spectrum data of the detector by an EM solution method, to obtain the real counts of photons in respective energy regions in the incident energy spectrum data of the detector.

8. The device of claim 5, wherein the processor is further configured for performing the detector response calibration by simulating an energy deposition process in a photon detector of the rays with known energy according to metal fluorescence data.

9. A non-transitory computer-readable storage medium having stored therein instructions that, when executed by a processor, causes the processor to perform the method of claim 1.

* * * * *